(12) United States Patent
Collins et al.

(10) Patent No.: US 6,718,453 B2
(45) Date of Patent: Apr. 6, 2004

(54) APPARATUS AND METHOD FOR A CHANNEL ADAPTER NON-CONTIGUOUS TRANSLATION PROTECTION TABLE

(75) Inventors: Brian M. Collins, Aloha, OR (US); Dick Reohr, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 362 days.

(21) Appl. No.: 09/816,078

(22) Filed: Mar. 26, 2001

(65) Prior Publication Data

US 2002/0178340 A1 Nov. 28, 2002

(51) Int. Cl.[7] .............................................. G06F 12/10
(52) U.S. Cl. ....................................................... 711/206
(58) Field of Search ................................. 711/202, 206, 711/207

(56) References Cited

U.S. PATENT DOCUMENTS

| | | | | |
|---|---|---|---|---|
| 5,895,501 A | * | 4/1999 | Smith | 711/207 |
| 5,895,503 A | * | 4/1999 | Belgard | 711/202 |
| 6,012,132 A | * | 1/2000 | Yamada et al. | 711/207 |
| 6,163,834 A | * | 12/2000 | Garcia et al. | 711/206 |
| 6,374,341 B1 | * | 4/2002 | Nijhawan et al. | 711/207 |

OTHER PUBLICATIONS

Milenkovic, M. Microprocessor Memory Management Units. IEEE Micro, Apr. 1990.*
Tommy. Re: db_block_size and performance. [Online] news://comp.database.oracle.server, Oct. 1998.*
Teller et al. TLB consistency on highly parallel shared-memory multiprocessors. Proceedings of the 21st Hawaii International Conference on System Sciences, pp. 184–193, Jan. 1988.*

* cited by examiner

Primary Examiner—Matthew Kim
Assistant Examiner—Woo M. Choi
(74) Attorney, Agent, or Firm—Schwegman, Lundberg, Woessner & Kluth, P.A.

(57) ABSTRACT

A method and apparatus for non-contiguous translation protection table that includes one or more first registers, two or more second registers, an address translator, and a detector. Each first register contains a value denoting a size of each of two or more blocks of memory. Each second register contains a value denoting the starting physical address of an associated one of the two or more blocks of memory. The address translator receives a virtual address and translates the virtual address to a physical address of one of the two or more blocks of memory. The detector detects whether the received virtual address is outside of the range of the two or more blocks of memory. The blocks of memory may be translation protection tables that reside in physically non-contiguous memory locations.

28 Claims, 4 Drawing Sheets

APPARATUS AND METHOD FOR A CHANNEL ADAPTER NON-CONTIGUOUS TRANSLATION PROTECTION TABLE

BACKGROUND

1. Field

This invention relates to memory address translation, and more specifically to non-contiguous address translation tables in memory.

2. Background

A switched fabric network system may use a scheme of a translation protection table (TPT) for all memory registration. This table may be created in system memory, and allows a device to read the table to gain access to a physical address, converted from a virtual address, for storage locations.

FIG. 1 shows a block diagram of elements existing at a processor node in a switched fabric system. An operating system 10 may communicate with a channel adaptor 12 to get a physical address translation. A channel adaptor 12 (e.g. host channel adaptor (HCA), target channel adaptor (TCA), etc.) may use a system memory 14 resident translation protection table in order to convert virtual addresses used by applications into physical addresses used by the channel adaptor 12. In current channel adaptor designs, this table is required to be entirely contiguous in physical memory. Therefore, the operating system is required to lock a large piece of physical memory and keep it locked during all operations carried out by the channel adaptor.

FIG. 2 shows a diagram of connections between a channel adaptor and a contiguous TPT table. The dotted line separates the channel adaptor logic 12 from system memory 14. System memory 14 contains a translation protection table 16. Channel adaptor 12 includes a register 18 containing the table size, a register 20 containing the base physical address of the table, a comparator 22, and an adder 24. The channel adaptor hardware tracks the table size of TPT table 16 as well as the base physical address. The index is a portion of a virtual address from the operating system. Comparator 22 compares the received index with the table size stored in register 18 to determine if the index is out of the bounds of TPT table 16, and if so, generates an "index out of bounds" error. If the index is not out of bounds, the address stored in register 20 is added to the index by adder 24 generating a physical address to TPT table 16. A channel adapter stores information not only associated with the base of the to TPT table 16, but also the number of entries in the table. For any given index into the TPT table, the channel adaptor is able to locate the physical address of the appropriate entry in the table as well as check the entry as outside the bounds of the TPT table.

TPT table 16 is a fixed size. However, the operating system may need, during the course of operation, to change the initial set up for the TPT table (e.g., in order to map additional memory pages for a recently started application). A problem exists if the operating system desires to grow the one and only TPT table in the system when it is currently being used by the channel adaptor. The operating system has two options to possibly solve this problem. First, the operating system may flush the current TPT table and move the entire table to a larger contiguous location in system memory (to allow for more entries to be mapped). This larger location may be very large, e.g., supporting mapping for $2^{27}-1$ physical pages of memory. A TPT table supporting even a fraction of this memory map can easily be gigabytes in size.

Second, the operating system may stop operations on the channel adaptor long enough to free up or rearrange the current TPT table to make room for the newly requested page mappings. Neither of these two options is desirable. The first option is unlikely to be able to locate a large portion of contiguous system memory that can fit the bigger TPT table. The second would require operations on the channel adaptor to be halted for a period of time while the TPT table is reorganized.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to method and apparatus for non-contiguous translation protection table where the translation protection table may consist of multiple translation tables that reside in physically non-contiguous memory locations. Moreover, the multiple translation tables may be of varying sizes, or may all be of the same size. A channel adapter storing information about multiple translation protection table segments allows for a more flexible software usage model of the TPT table with relatively minor hardware overhead.

Figure 1:
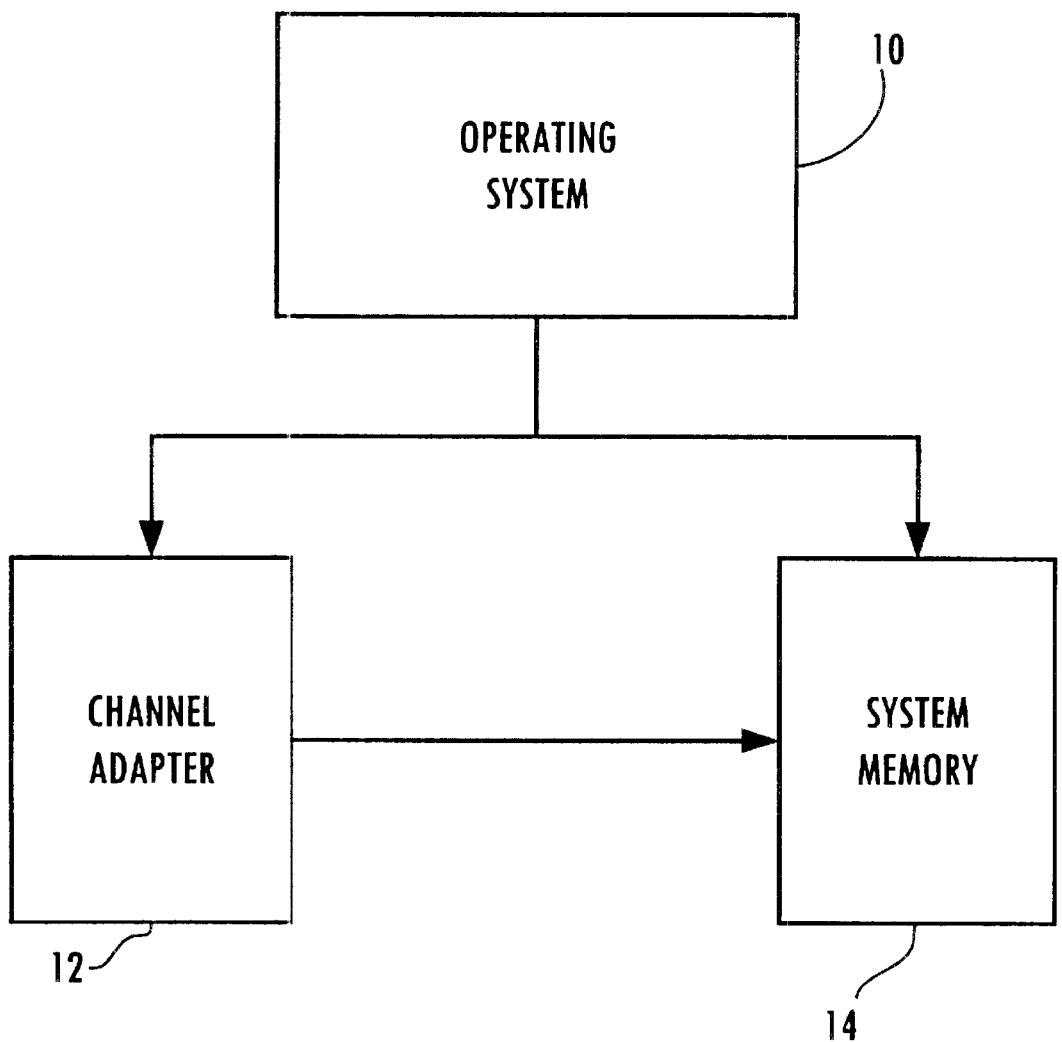
FIG. 1 is a block diagram of elements existing at a processor node in a switched fabric system.
Figure 2:
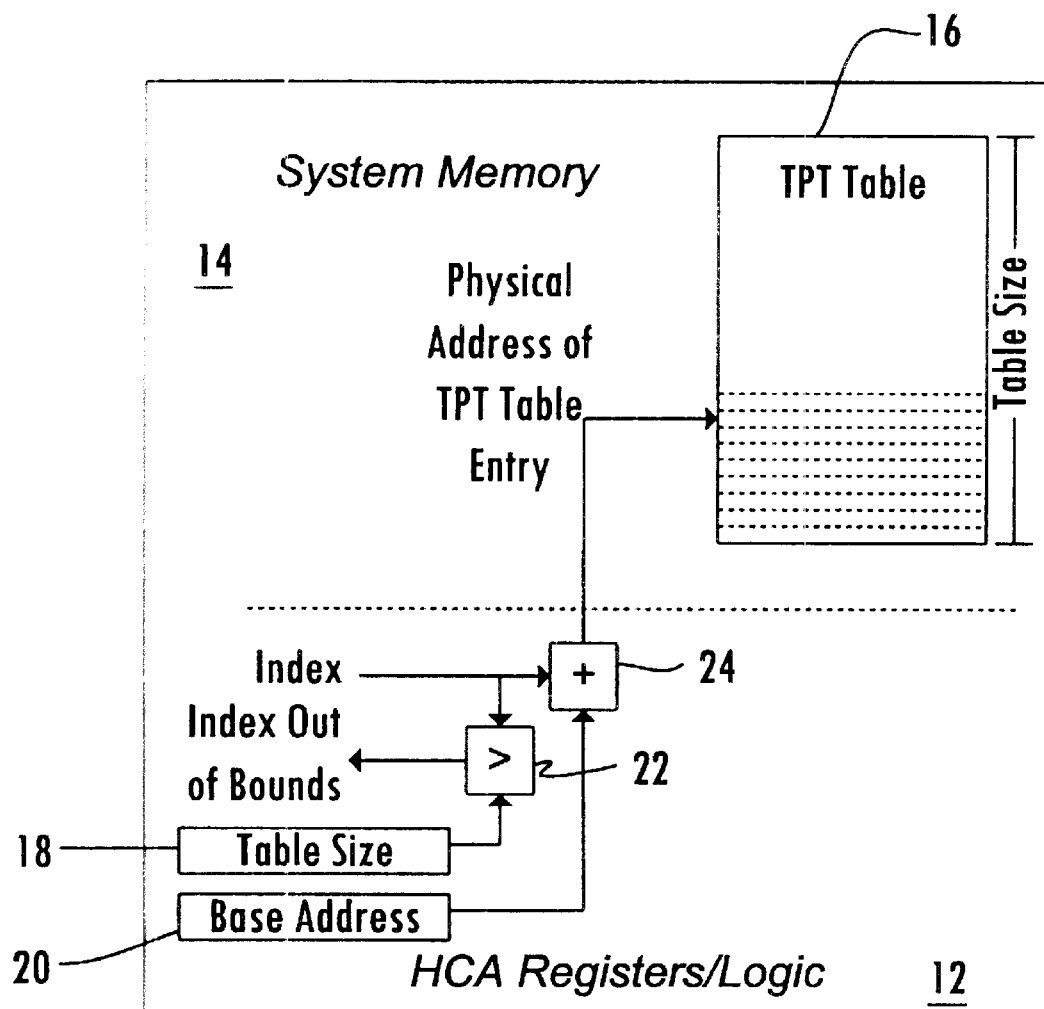
FIG. 2 is a diagram of connections between a channel adaptor and a contiguous TPT table.
Figure 3:
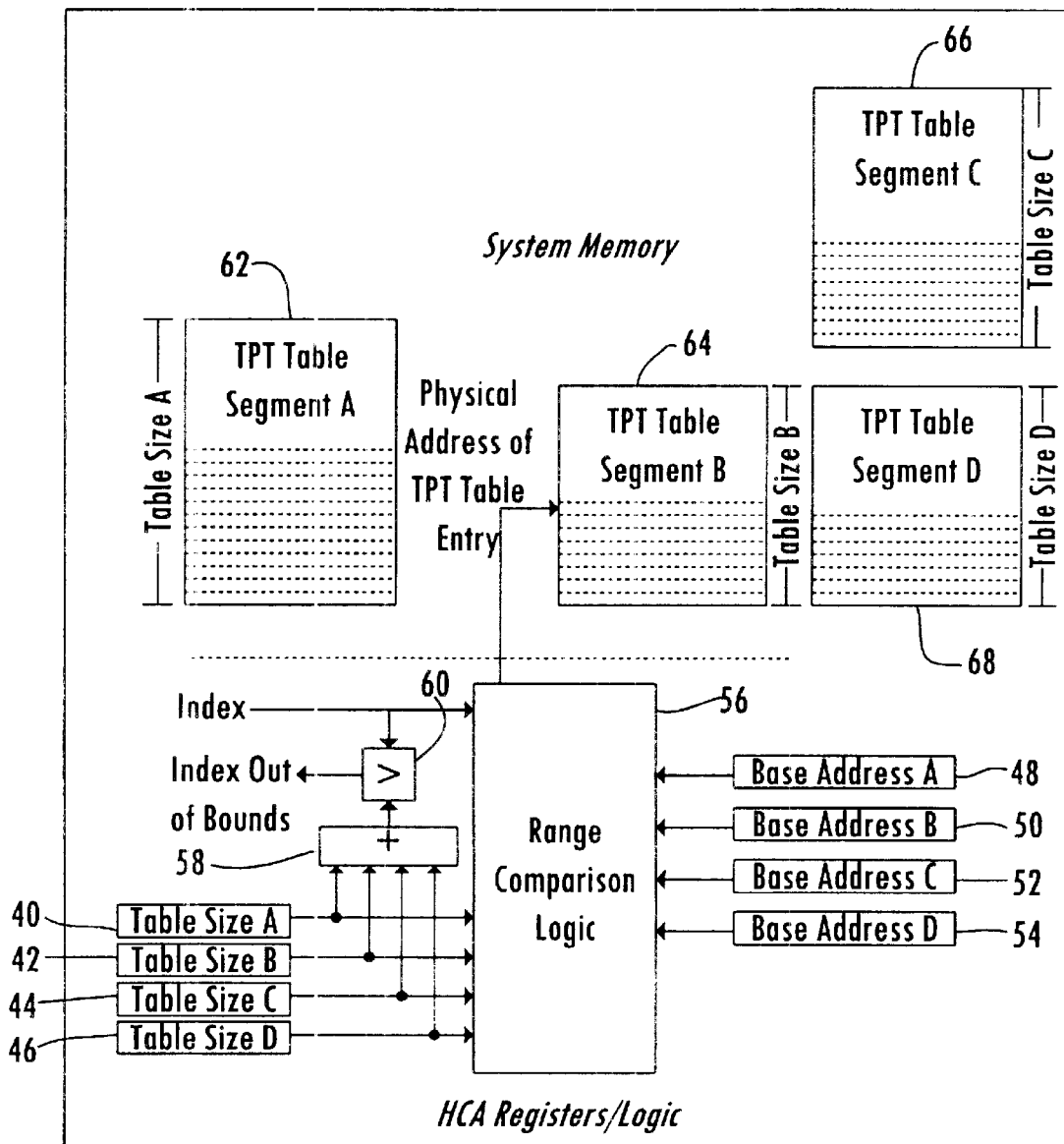
FIG. 3 is a diagram of a channel adaptor interfacing to a series of TPT table segments according to an example embodiment of the present invention.

FIG. 3 shows a diagram of a channel adaptor interfacing to a series of translation protection table segments according to an example embodiment of the present invention. In this example embodiment, the translation protection table consists of multiple segments, 62 through 68. Each individual translation protection table segment may be treated just like the translation protection table discussed and shown in FIG. 2 previously (i.e. occupy physically contiguous system memory locations, channel adaptor maintains information regarding the base address and a number of entries for each, etc.). The channel adaptor in this example embodiment is programmed such that each translation protection table segment may be accessed like a single contiguous translation protection table. For example, an index not found in the first TPT table (e.g. TPT table 62) may be checked for in the next logical TPT table (e.g. TPT table 64) just as if the two segments were physically contiguous.

Each TPT table segment, 62–68, has an associated table size and base address. TPT tables 62-through 68 have table size registers 40 through 46 associated, and base address registers 48 through 54 associated respectively.

For a given index into the TPT table, the channel adaptor may be required to determine which TPT table segment contains the specific entry and perform the appropriate bounds checking. This function becomes more complicated than in the single TPT case described previously. The out of bounds check done by comparator 60 takes into account the size of all the segments in use. A summation of the table size values stored in registers 40 through 46 is performed by adder 58 and the result compared to the index by comparator 60.

The range comparison logic consists of a series of arithmetic and comparison functions used to determine which segment contains the given TPT table entry. Table size registers 40 through 46 and base address registers 48 through 54 are connected to range comparison logic 56. Range comparison logic 56 receives the index and determines which TPT table segment the index is addressing. Generation of the correct physical address needs to take into account the size of the segments logically ahead of the segment containing the index. For example, an index accessing a TPT table entry in TPT table segment 64 may have a physical address calculated as follows: index–table size of table segment 62+base address of table segment 64=physical address of TPT table entry. Therefore, after the range is checked, the index is added to the appropriate base after subtracting out the previous TPT table size(s). Each TPT table segment, 62 through 68, may be created in memory as needed. Further, the last TPT table segment, i.e. 68, may be grown or expanded if necessary. This is advantageous in that while the last TPT table segment may be grown, the remaining TPT segments may remain unchanged and in use by the channel adapter.

Figure 4:
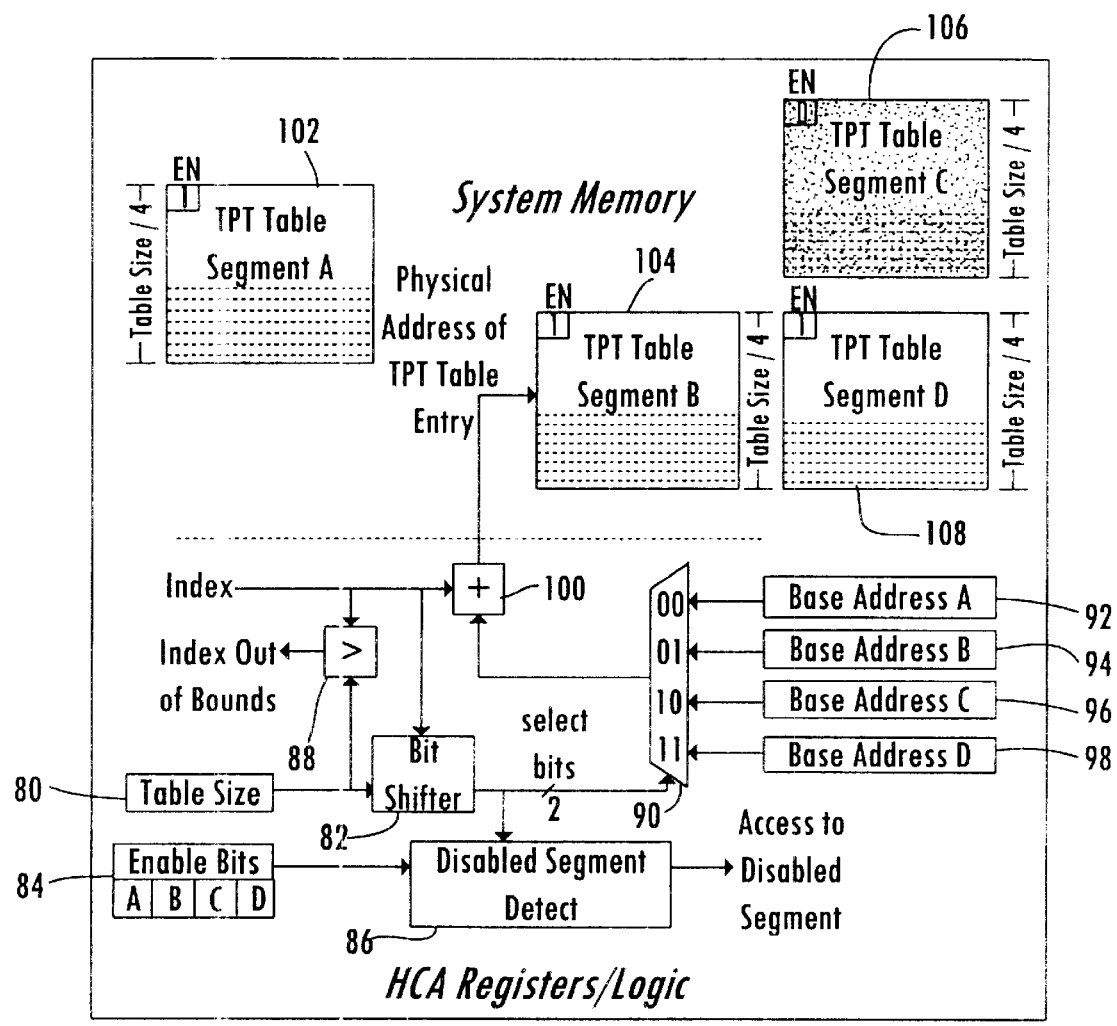
FIG. 4 is a diagram of a channel adaptor interfacing to a series of TPT table segments according to another example embodiment of the present invention.

FIG. 4 shows a diagram of a channel adaptor interfacing to a series of translation protection table segments according to another example embodiment of the present invention. In this example embodiment, the size of each TPT table segment may be fixed for the channel adaptor. Therefore, all TPT table segments for this channel adaptor use the same number of entries. This reduces the channel adapter hardware logic required for performing bounds checking and determining which TPT table segment contains the specific entry identified by the received index.

As shown in FIG. 4, hardware is reduced since only one register 80 holding a table size value may be required. The table size in register 80 is still compared with the index by comparator 88 to determine if the index is out of bounds of the TPT table segments 102 through 108. Each TPT table segment, 102 through 108, is the same size. This is the table size stored in register 80 divided by the number of TPT table segments. In this example embodiment of the present invention, each of TPT table segments, 102, 104, 106, 108, have a size of the table size in register 80 divided by four, since there are four TPT table segments.

The channel adaptor logic in this example embodiment also contains a register 84 that contains one enable bit for each of TPT table segments 102 through 108. This enable bit may be set by a software making register 84 a programmable register. The enable bits inform the channel adaptor hardware whether a particular TPT segment is active. Software may take advantage of this feature in the channel adaptor as needed. Disabling all of the supported TPT table segments above the first segment, i.e., segment 102, results in one physically contiguous TPT table in system memory as is used in current systems (e.g., FIG. 2).

The channel adaptor embodiment shown in FIG. 4 also supports four base address registers 92 through 98. Each register may be programmed to take into account the subtraction of the previous TPT table segments. For example, the base address contained in register 92 may equal the starting physical address of TPT table 102. The base address stored in register 94 may equal the starting physical address to TPT table 104–the TPT table size stored in register 80/4. The base address contained in register 96 may equal the starting physical address of TPT table segment 106—2 times the TPT table size stored in register 80/4. Finally, base address stored in register 98 may equal the starting physical address of TPT table segment 108—3 times the TPT table size stored in register 80/4.

This programming allows the hardware to minimize the number of arithmetic functions required to derive the physical address associated with any given index into the TPT table. As shown in FIG. 4, the index out of bounds and physical address of TPT table entry generation are similar to that shown in FIG. 2. The bit shifter 82, adder 100, and multiplexer 90 form range comparison logic. Bit shifter 82 may be used to select which of the TPT table segments the given index is accessing. Bit shifter 82 receives the index into the TPT table and receives the size table value in register 80 as inputs and produces a two bit select used to multiplex the contents of the four base address registers 92 through 98 to adder 100. Bit shifter 82 accomplishes this by using the two bits of the received index which correspond to the two most significant bits of the programmed TPT table size in register 80, normalized to a zero based index. For example, if the TPT table size in register 80 is 0×1000, containing entries 0×0000 through 0×0FFF, this suggests that each TPT table segment contains one quarter of these entries. This is shown in the following table:

| Segment | TPT Table Entries | Bit 11 | Bit 10 |
| --- | --- | --- | --- |
| 102 | 0x0000 - 0x03FF | 0 | 0 |
| 104 | 0x0400 - 0x07FF | 0 | 1 |
| 106 | 0x0800 - 0x0BFF | 1 | 0 |
| 108 | 0x0C00 - 0x0FFF | 1 | 1 |

In the example embodiment shown in FIG. 4, bits 11 and 10 of the index provide a convenient select for the appropriate base address register. Bit shifter 82 outputs bits 11 and 10 of the index that are used as selects to multiplexer 90. The channel adaptor hardware in the embodiment shown in FIG. 4 illuminates the complex comparison and arithmetic operations that may be required in the example embodiment shown in FIG. 3. This is accomplished by using bit shifter 82 and careful software programming of the base address and TPT size register. Bit shifter 82 also provides a convenient way to check the enables associated with each TPT table segment, 102 through 108. The channel adaptor maintains four bit register 84 indicating which TPT table segments are currently valid. As shown in FIG. 4, TPT table segment 106 is currently disabled, as illustrated by the enable bit in the upper left hand corner of TPT table segment 106 being equal to zero. Indices that attempt to access TPT table segment 106 may be detected by comparing the enable bits to the output of bit shifter 82. This may be performed by detector 86 that outputs an error signal (access to disabled segment) for indices that attempt to access a TPT table segment that is currently not enabled.

Methods and apparatus according to the present invention are advantageous in that the hardware and the channel adaptor is simpler, flexible, and saves cost by reducing gate count, complexity to test, etc. The present invention eliminates problems encountered in current channel adaptor implementations by providing channel adaptor support for a non-physically contiguous TPT table in system memory. According to the present invention, a channel adaptor contains programmable information associated with not one, but multiple TPT table segments. Each segment is treated as logically contiguous from the channel adapters point of view, but may be located anywhere within system memory. This allows an operating system to scale the size of a TPT table by essentially "stacking" new smaller pieces of logically contiguous memory on top of the previous configured TPT table. These smaller portions are not only more likely to be found available in system memory but they may also be added to the TPT table dynamically without interrupting channel adapter operations.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A channel adapter comprising:
    at least one size register, the at least one size register containing a value denoting a size of each of at least two blocks of memory, the at least two blocks of memory being two translation protection table segments of a single translation protection table, with at least one of the at least two blocks of memory physically non-contiguous with other blocks of memory of the translation protection table;
    at least two base address registers, each at least two base address registers containing a value denoting the starting physical address of an associated one of the at least two blocks of memory;
    an address translator, the address translator receiving a virtual address and translating the virtual address to a physical address of one of the at least two blocks of memory; and
    a detector, the detector detecting whether the received virtual address is outside of the range of the at least two blocks of memory.

2. The adapter according to claim 1, wherein the at least two blocks of memory are of the same size.

3. The adapter according to claim 1, further including a third translation protection table segment as a block of memory physically contiguous with one of the at least two blocks of memory.

4. The adapter according to claim 1, wherein at least one of the blocks of memory physically non-contiguous with other blocks of memory of the translation protection table is expandable.

5. The adapter according to claim 1, wherein the physical address comprises a sum of the virtual address and the starting physical address.

6. The adapter according to claim 1, wherein the at least two blocks of memory are located in a system memory.

7. The adapter according to claim 1, wherein the channel adapter comprises one of a host channel adapter (HCA) and a target channel adapter (TCA).

8. The adapter according to claim 1, further comprising one at least one size register for each one of the at least two blocks of memory.

9. The adapter according to claim 8, wherein at least two blocks of memory are of different sizes.

10. The adapter according to claim 1, further comprising an enable register, the enable register containing a bit for each at least two blocks of memory denoting whether the associated block of memory is enabled, the enable register being software programmable.

11. The adapter according to claim 1, wherein each at least two blocks of memory is allocated dynamically as needed.

12. The adapter according to claim 11, wherein the at least two blocks of memory are allocated by an operating system.

13. The adapter according to claim 12, wherein the allocation by the operating system is in response to a request by an application.

14. The adapter according to claim 1, the address translator comprising a range comparator, the range comparator receiving the virtual address and determining which at least two blocks of memory the virtual address is within.

15. A method for address translation in a channel adapter comprising:
    storing at least one size denoting a size of each of at least two blocks of memory, the at least two blocks of memory being two translation protection table segments of a single translation protection table, with at least one of the at least two blocks of memory physically non-contiguous with other blocks of memory of the translation protection table;

storing at least two base addresses, each at least two base addresses denoting the starting physical address of an associated one of the at least two blocks of memory;

receiving a virtual address;

translating the virtual address to a physical address of one of the at least two blocks of memory; and detecting whether the received virtual address is outside of the range of the at least two blocks of memory.

16. The method according to claim 15, further comprising allocating each at least two blocks of memory dynamically as needed.

17. The method according to claim 16, further comprising receiving a request from an application and allocating a block of memory in response to the request.

18. The method according to claim 15, wherein the translating further comprises receiving the virtual address and determining which at least two blocks of memory the virtual address is within.

19. The method according to claim 18, further comprising generating the physical address by adding the virtual address to the starting physical address.

20. The method according to claim 15, wherein the at least two blocks of memory are of the same size.

21. The method according to claim 15, further including a third translation protection table segment as a block of memory physically contiguous with one of the at least two blocks of memory.

22. The method according to claim 15, wherein at least one of the blocks of memory physically non-contiguous with other blocks of memory of the translation protection table is expandable.

23. The method according to claim 15, further comprising storing one size for each one of the at least two blocks of memory.

24. The method according to claim 15, wherein at least two blocks of memory are of different sizes.

25. A system for address translation comprising:

a channel adapter, the channel adapter comprising:

at least one size register, the at least one size register containing a value denoting a size of each of at least two blocks of memory, the at least two blocks of memory being two translation protection table segments of a single translation protection table, with at least one of the at least two blocks of memory physically non-contiguous with other blocks of memory of the translation protection table;

at least two base address registers, each at least two base address registers containing a value denoting the starting physical address of an associated one of the at least two blocks of memory;

an address translator, the address translator receiving a virtual address and translating the virtual address to a physical address of one of the at least two blocks of memory; and a detector, the detector detecting whether the received virtual address is outside of the range of the at least two blocks of memory; and at least one storage device, the at least one storage device operatively connected to the channel adapter and containing the at least two blocks of memory.

26. The system according to claim 25, wherein the at least two blocks of memory are of the same size.

27. The system according to claim 25, further including a third translation protection table segment as a block of memory physically contiguous with one of the at least two blocks of memory.

28. The system according to claim 25, wherein each at least two blocks of memory is allocated dynamically as needed.

* * * * *